(12) United States Patent
Studebaker (10) Patent No.: US 6,394,217 B2
(45) Date of Patent: May 28, 2002

(54) DUAL DRAW AND RETURN FUEL MANIFOLD WITH INTEGRAL MOUNTING BRACKET FOR A VEHICLE

(75) Inventor: Curt J. Studebaker, Columbia City, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/783,674

(22) Filed: Feb. 14, 2001

Related U.S. Application Data (62) Division of application No. 09/316,872, filed on May 21, 1999, now Pat. No. 6,213,243.

(51) Int. Cl.$^7$ .......................... B60K 15/01; F16L 41/02
(52) U.S. Cl. .................... 180/314; 285/62; 285/133.11; 285/124.1
(58) Field of Search ................................ 180/314, 69.4; 280/834; 285/62, 61, 64, 133.11, 133.3, 133.4, 133.5, 124.1, 124.2, 124.4, 124.5

(56) References Cited

U.S. PATENT DOCUMENTS

| 1,483,663 A | 2/1924 | Johnson |
| 3,088,755 A | 5/1963 | Klamm |
| 4,287,908 A | 9/1981 | Storgard |
| 5,018,499 A | 5/1991 | Usui |
| 5,323,808 A | 6/1994 | Shimizu |
| 5,960,809 A | * 10/1999 | Keller .......................... 137/12 |

* cited by examiner

Primary Examiner—Peter English
(74) Attorney, Agent, or Firm—Jeffrey P. Calfa; Neil T. Powell; Dennis Kelly Sullivan

(57) ABSTRACT

A dual draw and return fuel manifold with an integral mounting bracket for use on a mobile vehicle containing at least two fuel tanks such as a heavy duty truck. The invention overcomes problems associated with assembling several fittings to a bracket and reduces the opportunities for leaks to develop in a vehicle fuel system by incorporating the fittings and mounting apparatus into a one piece design. There is a manifold which contains two three way tees integrated onto a mounting bracket or body. The mounting bracket has two engagement legs for engagement to a chassis mounted component or to a vehicle drive train component. In a preferred embodiment these engagement legs will be engaged on either side of a transmission of the vehicle. The return and supply manifolds are located one on top of another on the manifold such that they may be easily connected to the high pressure tubing of the fuel system. The mounting bracket in one embodiment is on a slight angle such that the hook up to the engine from each of the return and supply three way tee is at a slight up angle rather than horizontal. The slight up angle of the hook up to engine port of the three way tees further improves the accessibility for installation on an assembly line. In a second embodiment the two three way tees may be integrated into a single body unit with the two engagement legs.

3 Claims, 9 Drawing Sheets

FIG. 1
PRIOR ART

PRIOR ART

PRIOR ART

DUAL DRAW AND RETURN FUEL MANIFOLD WITH INTEGRAL MOUNTING BRACKET FOR A VEHICLE

This is a division of application Ser. No. 09/316,872, filed May 21, 1999, U.S. Pat. No. 6,213,243.

BACKGROUND OF THE INVENTION

The present invention relates to a dual draw and return fuel manifold with an integral mounting bracket for use on a mobile vehicle containing at least two fuel tanks such as a heavy duty truck. The invention overcomes problems associated with assembling several fittings to a bracket and reduces the opportunities for leaks to develop in a vehicle fuel system by incorporating the fittings and mounting apparatus into a one piece design.

THE PRIOR ART

Figure 1:
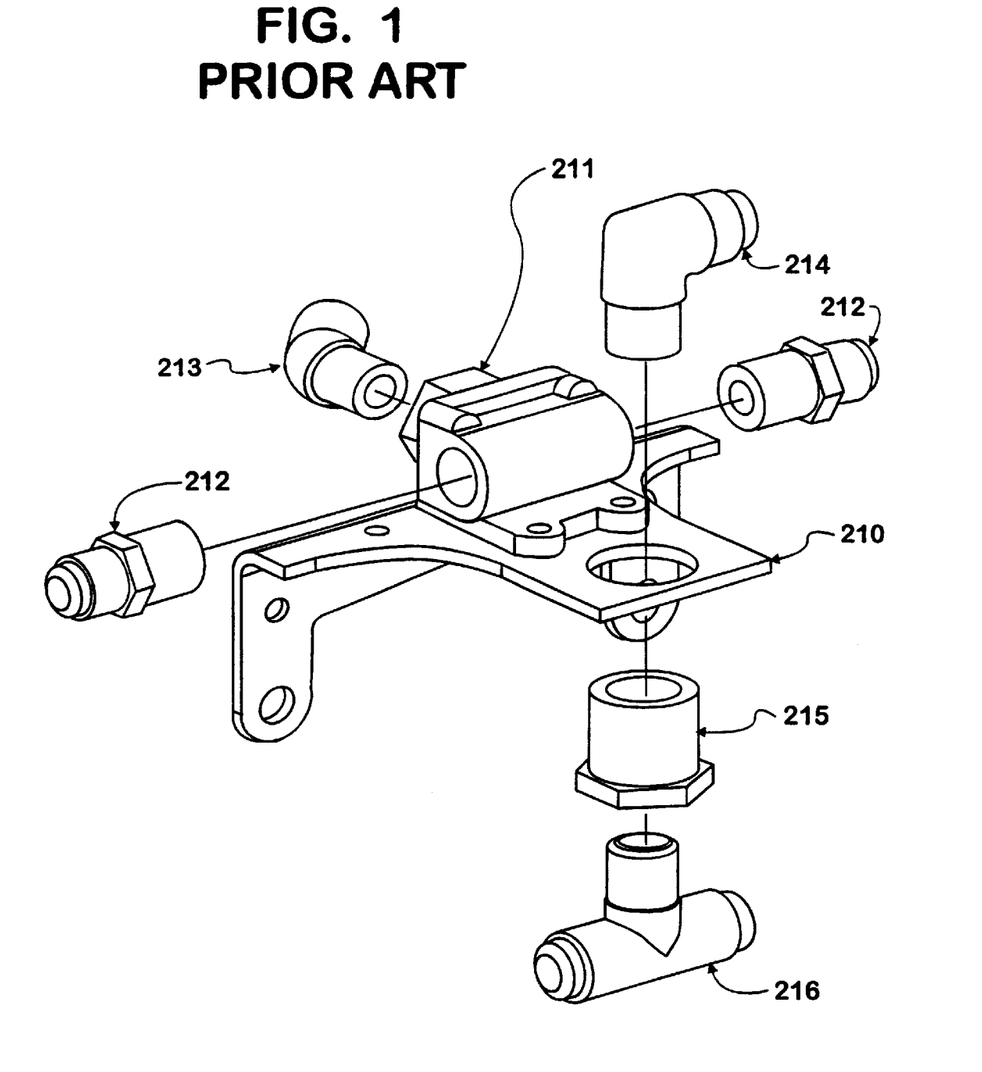
FIG. 1 is a prior art embodiment of a fuel system draw and return manifold.
Figure 2:
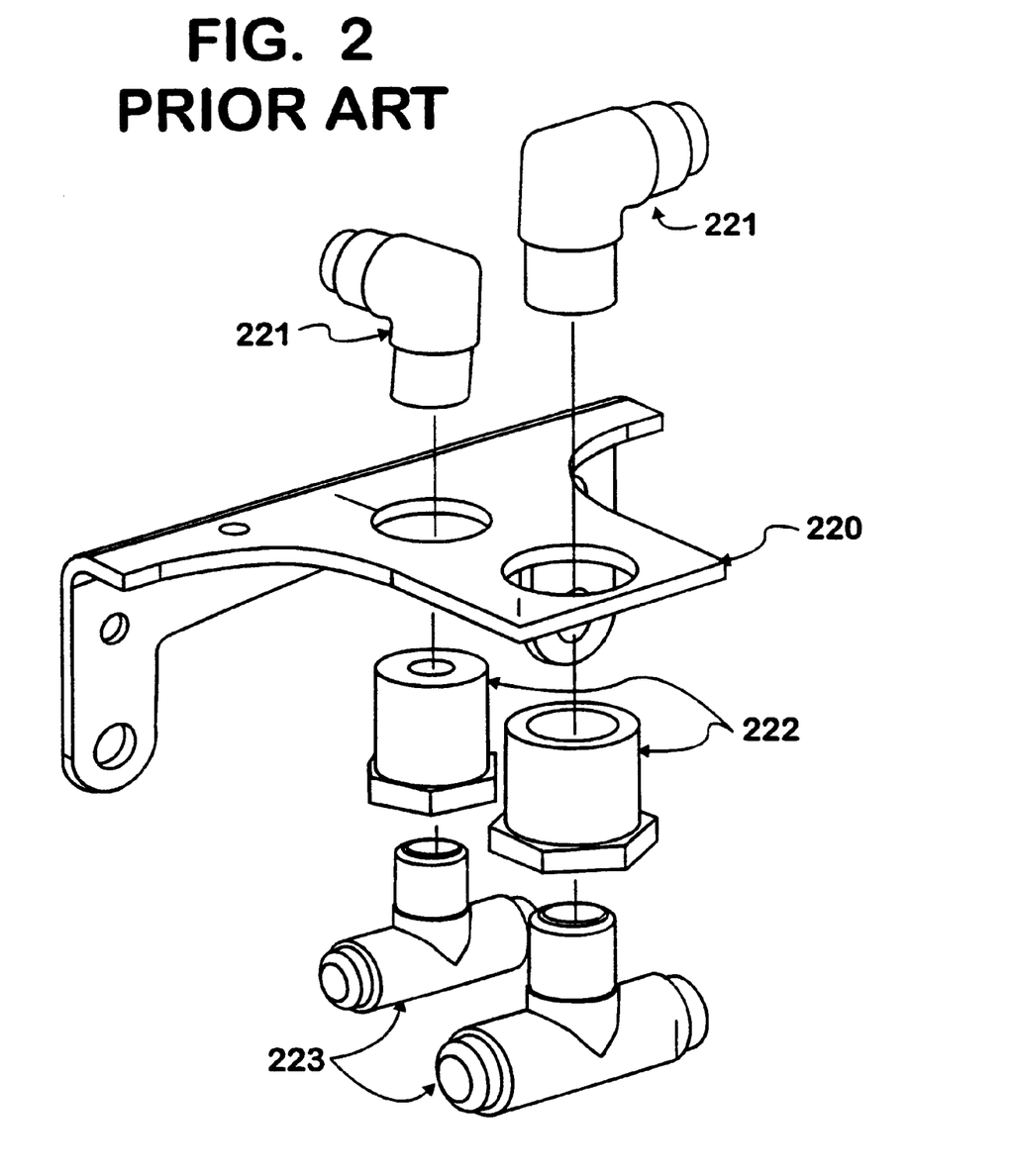
FIG. 2 is a prior art embodiment of a fuel system draw and return manifold.
Figures 3, 4F:
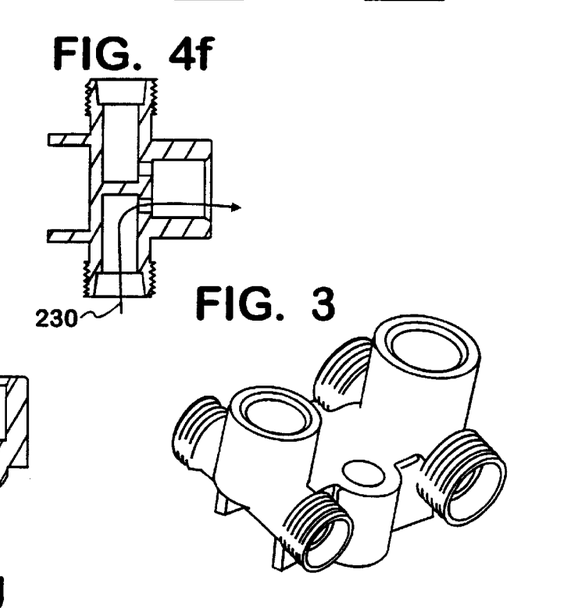
FIG. 3 is a perspective view of a prior art embodiment of a fuel system draw and return manifold.
FIG. 4f is the Section 4f—4f cutaway of view of the prior art embodiment shown in FIG. 4b.
Figure 4A:
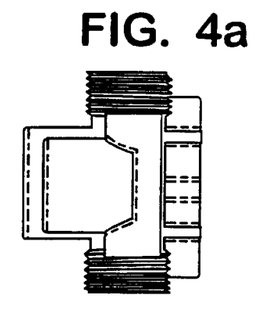
FIG. 4a is a side view of the prior art embodiment shown in FIG. 3.
Figure 4B:
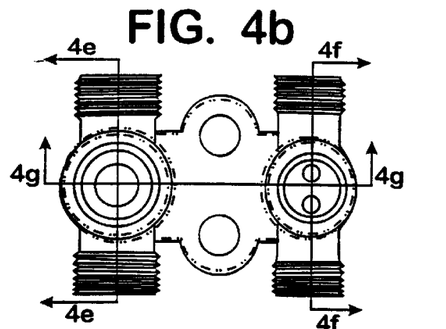
FIG. 4b is a top down view of the prior art embodiment shown in FIG. 3.
Figure 4C:
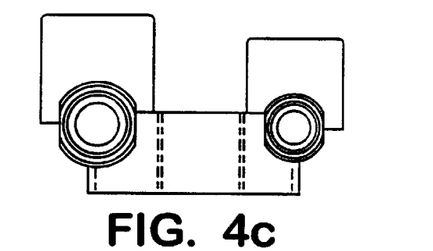
FIG. 4c is a front view of the prior art embodiment shown in FIG. 3.
Figure 4D:
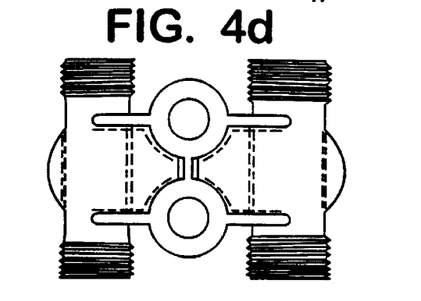
FIG. 4d is a bottom upwards view of the prior art embodiment shown in FIG. 3.
Figure 4E:
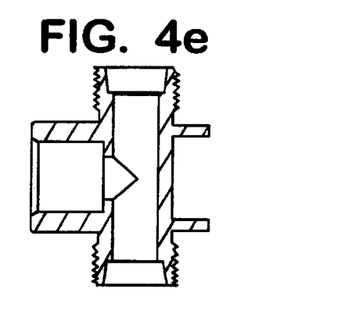
FIG. 4e is the Section 4e—4e cutaway of view of the prior art embodiment shown in FIG. 4b.
Figure 4G:
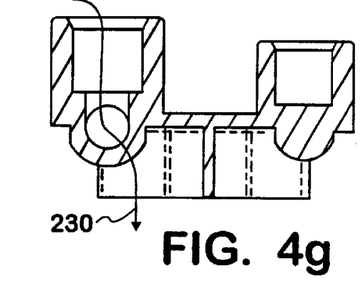
FIG. 4g is the Section 4g—4g cutaway of view of the prior art embodiment shown in FIG. 4b.
Figure 5A:
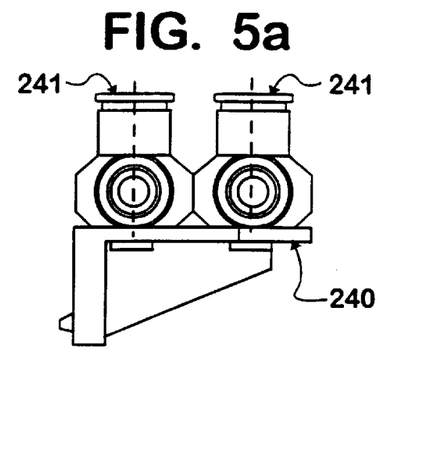
FIG. 5a is a side view of a prior art embodiment of a fuel system draw and return manifold.
Figure 5B:
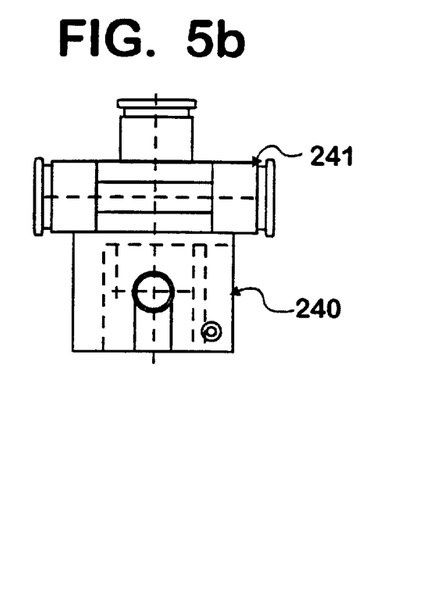
Figure 5C:
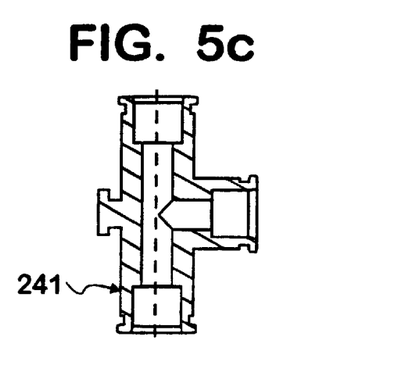
Figure 5D:
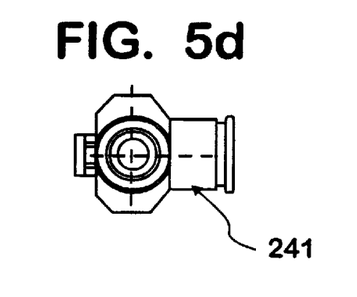
FIG. 5d is a side view of the prior art tee shown In FIG. 5c.
Figure 6:
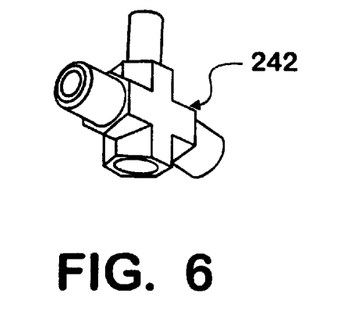
FIG. 6 is a prior art three way tee for a fuel system draw and return manifold.
Figure 7:
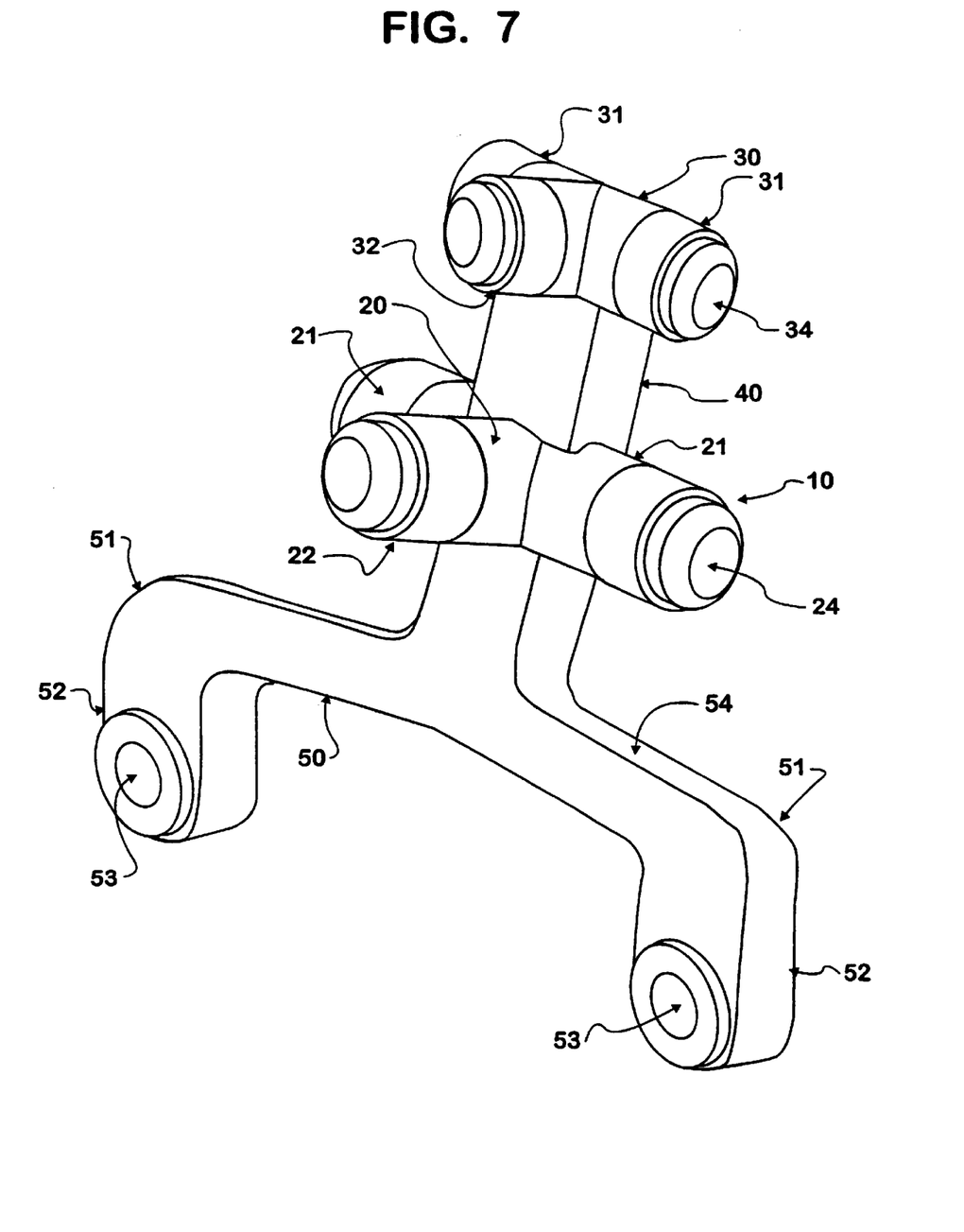
FIG. 7 is a front perspective view of a preferred embodiment of a one piece dual fuel draw and return manifold with an integral mounting bracket made in accordance with the invention.
Figures 8, 9, 11:
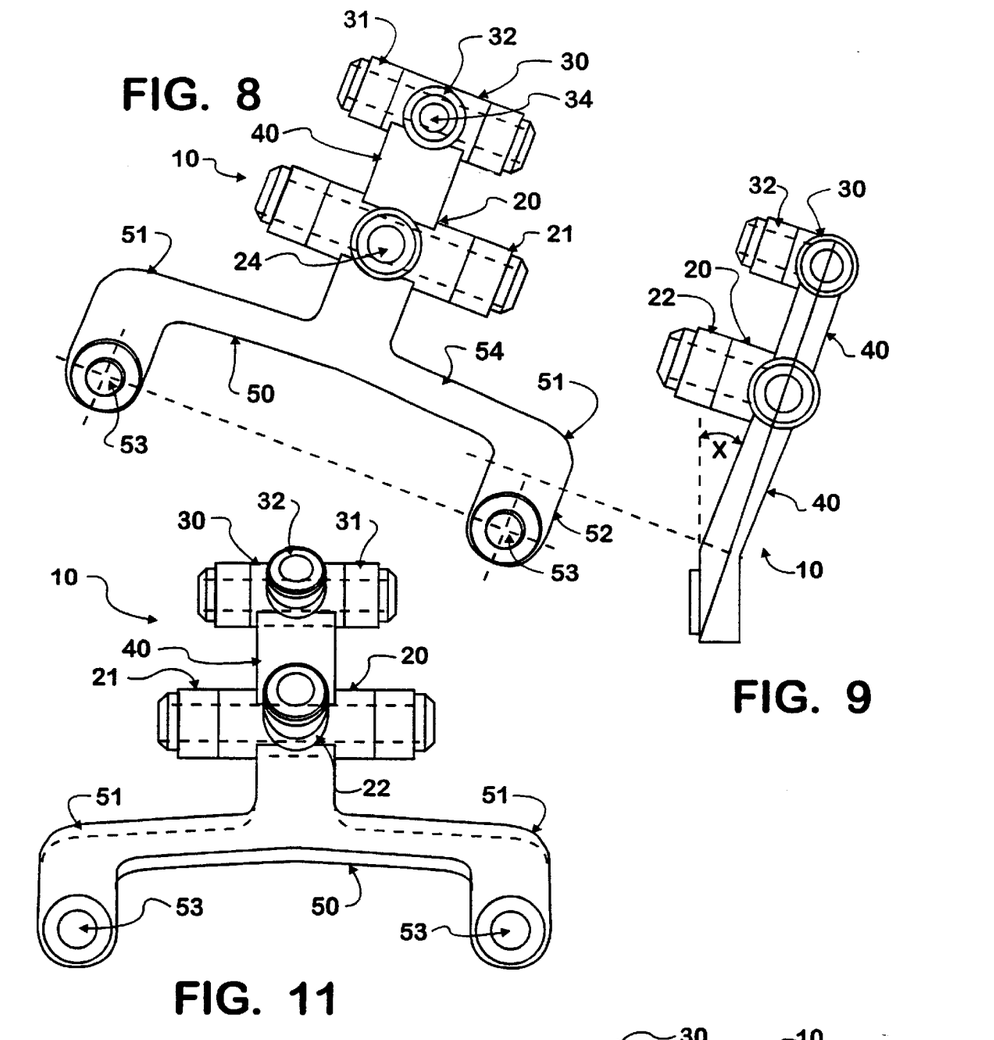
FIG. 8 is an auxiliary front view of the fuel draw and return manifold shown in FIG. 7.
FIG. 9 is a side view of the fuel draw and return manifold shown in FIG. 7.
FIG. 11 is a front view of the fuel draw and return manifold shown in FIG. 7.
Figure 10:
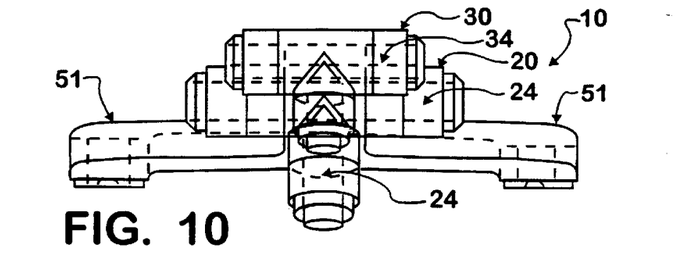
FIG. 10 is a top view of the fuel draw and return manifold shown in FIG. 7.

Heretofore, vehicles with dual fuel tanks required multiple fittings to provide parallel supply and return of fuel to and from an internal combustion engine of the vehicle. Diesel engines reject some fuel hence the requirement for a fuel return. There were fuel lines that ran from each tank as a supply. At some point the lines joined to become a single fuel supply line to the engine fuel system. In most cases conventional single piece or multi-piece Tee joints were used. The fuel which was unused by the engine was returned by a single fuel line which at some time split to return to both fuel tanks. Conventional single pieces in combination or multi-piece tee joints also accomplished this return fuel split. The tee joints were mounted directly to a chassis component such as a frame rail or a frame rail to frame rail cross support or the tee joints were mounted to one or more mounting brackets. The mounting brackets would be mounted to a chassis component or a chassis mounted component. Some of the prior art mounting brackets and tee joints are shown in FIGS. 1 to 6. The prior art embodiment shown in FIG. 1 has a separate steel bracket 210 with a high flow return flow splitter 211 engaged to the steel bracket 210. There are separate straight brass fittings 212 engaged to each side of the return flow splitter 211, with a 45 degree brass fitting 213 engaged to the front of the return flow splitter 211. There is a separate brass elbow 214 engaged to a brass bulkhead fitting 215 through a hole in the steel bracket 210. The bulkhead fitting 215 is engaged to a brass tee 216. In the prior art shown in FIG. 2, there is a separate steel bracket 220. There are separate brass elbows 221 engaged to brass bulkhead fittings 222. There are separate brass tees 223 engaged to the bulkhead fittings 222. The main draw back of the prior art was the complexity of assembly which added both time and cost to vehicle production. The prior an shown in FIGS. 3 and 4a to 4g have integral passageways 230, however these were valves with unnecessary complexity in the distribution pathway. The tortuous pathway shown in FIG. 4f reduces the ability of the manifold to effectively distribute fuel due to pressure head loss. Additionally, the mounting arrangement of the prior art shown in FIGS. 3 and 4a to 4g is too cumbersome for vehicle chassis mounting. FIGS. 5a to 5d show an additional prior art design. There is a separate bracket 240 with separate tees 241 as in the other prior art shown. A different prior art tee 242 is shown in FIG. 6. There is a need for a non-complex, single piece, dual fuel supply and return manifold with an integral mounting bracket for use on a mobile vehicle,

SUMMARY OF THE INVENTION

Accordingly, it is a primary object of the invention to provide a simple one piece dual draw and return fuel manifold with an integral mounting bracket for use on a mobile vehicle, A manifold that contains two three way tees integrated onto a mounting bracket or body meets the primary object of invention as well as other objects. The mounting bracket has two engagement legs for engagement to a chassis or a chassis mounted component. One such chassis mounted component would be an upper portion of a vehicle transmission of the vehicle drive train. In a preferred embodiment these engagement legs will be engaged on the upper sides of a transmission of the vehicle. The return and supply manifolds may be located one on top of another on the manifold such that they may be easily connected to the tubing of the fuel system. The mounting bracket in one embodiment is on a slight angle such that the hook up to the engine from each of the return and supply three way tees are at a slight up angle rather than horizontal. The slight up angle of the hook up to engine ports of the three way tees further improves the accessibility for installation on an assembly line. In a second embodiment the two three way tees may be integrated into a single body unit with the two engagement legs.

BRIEF DESCRIPTION OF THE DRAWINGS

Other objects and advantages of the invention will become more apparent upon perusal of the detailed description thereof and upon inspection of the drawings in which:

FIG. 5b is a front view of the prior art embodiment shown in FIG. 5a, FIG. 5c is a side cutaway of a tee included in the prior art embodiment shown in FIG. 5a.

DESCRIPTION OF THE PREFERRED EMBODIMENT

FIGS. 7 to 14 illustrate preferred embodiments of a one piece dual draw and return fuel manifold with an integral mounting bracket for a mobile vehicle made in accordance with the teachings of the present invention and generally identified by the reference numeral 10. The manifold may also be referred to as a dual fuel supply and return manifold.

As shown, the dual draw and return fuel manifold 10 is provided for use in a vehicle equipped with a chassis comprised of two longitudinally running frame rails with cross member supports. The chassis has an engine, transmission, and drive-train engaged in the approximate center line longitudinally of the vehicle. There will be at least one fuel tank although in general there are two with each being mounted to one of the frame rails. One component of the chassis, engine, transmission or drive-train will be a chassis engagement component for the manifold 10.

The manifold 10 in its most fundamental embodiment has: a three way supply tee 20, a three way return tee 30, and an integrated chassis mounting means 50. The three way supply tee 20, the three way return tee 30 and the integrated chassis mounting means 50 are integrated as a single component. The components may be cast as one component. The tees and the mounting means may be integrated with an integrated mounting bracket 40 or with an integral mounting body 60.

The three way supply tee 20 has three ports with interconnecting internal passageways 24 for vehicles with two tanks. Only two ports are used if there is only one fuel tank on the vehicle. Of the three ports for the dual tank vehicle, there is a supply-from-tank connection port 21 for engagement to each of the fuel tanks, and a supply-to-engine connection port 22 for engagement to and supply of fuel to the engine. The three way return tee 30 also has three ports with interconnecting internal passageways 34 for vehicles with two tanks. Only two ports are used if there is only one fuel tank on the vehicle. Of the three ports of the three way return tee 30 for a two tank vehicle, there is a return-to-tank connection port 31 for engagement to each of the fuel tanks, and a return-to-manifold connection port 32 for engagement to and receipt of fuel from the engine. In the preferred embodiment, the three way supply tee 20, the three way return tee 30, and the mounting means 50 are integrated into the mounting bracket 40. The mounting bracket may be any shape that allows for alignment of the three way supply tee 20 and the three way return tee 30 to allow for easy hook up of tubing during vehicle assembly. The manifold 10 may be configured such the return-to-manifold connection port 32 of the three way return tee 30 and the supply-to-engine connection port 22 of the three way supply tee 20 are each directed forwards such that these ports are directed toward the engine when the manifold 10 is engaged to the chassis engagement component. In the preferred embodiment internal passages of the return-to-manifold connection port 32 and the supply-to-engine connection port 22 are in parallel. The return-to-tank connection ports 31 of the three way return tee 30 and the supply-from-tank connection ports 21 of the three way supply tee 20 may each be directed outwards and perpendicular to the forward facing ports. These outward ports would be directed from a centerline of the vehicle towards the fuel tanks when the manifold 10 is engaged. The advantage of having the engine engaged ports directed to the engine and the fuel tank engaged ports directed outwards from the vehicle centerline are to facilitate manufacture of the vehicle. Assembly line workers may easily reach the respective ports and the shortest possible tubing or piping runs may be made. This not only will reduce overall costs for vehicle manufacture but also may decrease the possibility of system leaks from better connections due to convenience and tubing reductions. Additionally, having the Internal passages of the three way return tee 30 and the three way supply tee 20 in parallel will also facilitate vehicle assembly as both connections to the engine and each fuel tank can be made without the worker relocating her hands to another location of the manifold 10. The tees may be integrated into the manifold 10 with one located directly above the other. In the preferred embodiment, the three way return tee 30 will have a smaller inner diameter than the three way supply tee 20. The three way return tee 30 may be integrated into the manifold 10 directly above the three way supply tee 20 when the manifold 10 is held upright or installed into a vehicle. The supply-from-tank connection ports 21, the supply-to-engine connection port 22, the return-to-tank connection ports 31, and the return-to-manifold connection port 32 may have threaded male fittings for ease of engagement.

Figure 12:
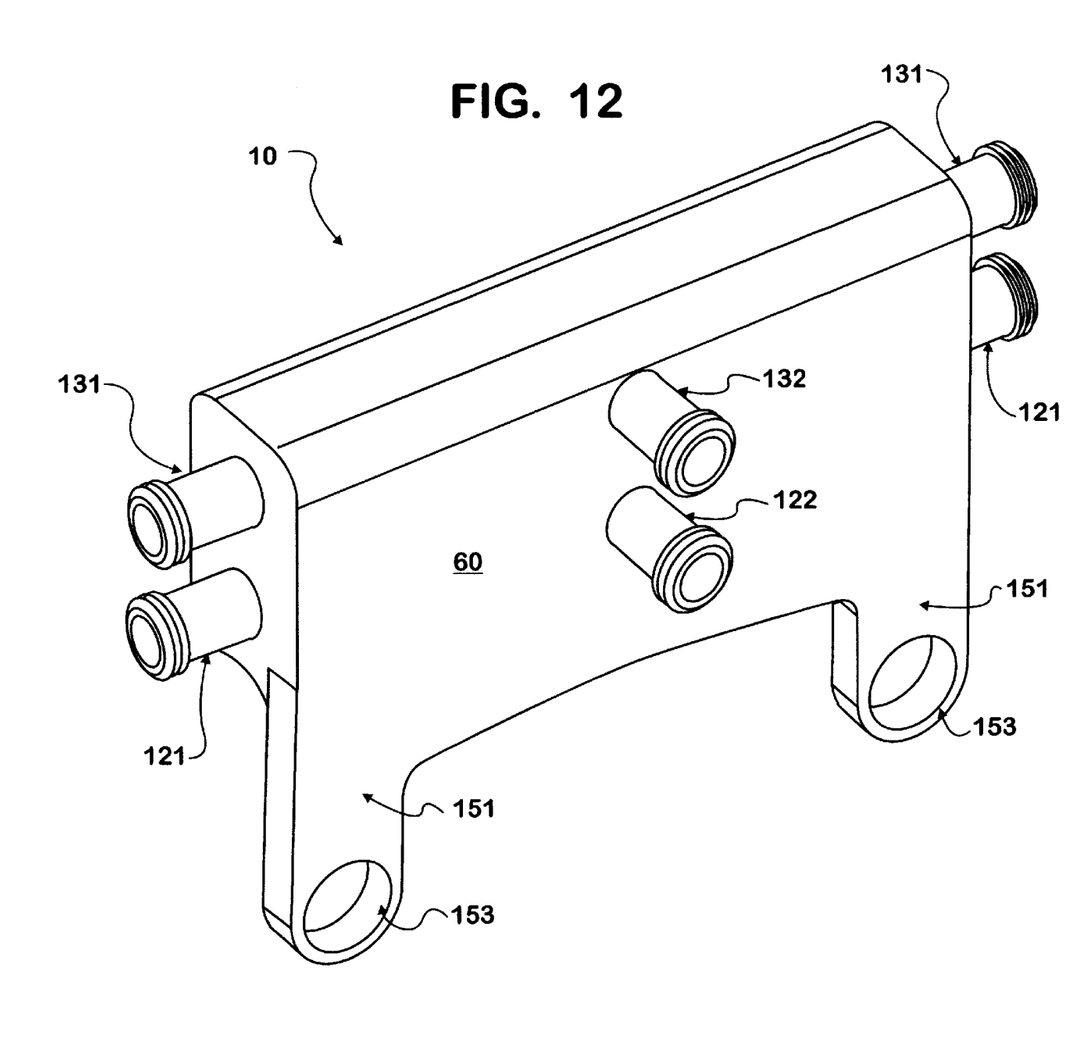
FIG. 12 is a front perspective view of a second embodiment of a one piece dual fuel draw and return manifold with an integral mounting body made in accordance with the invention.
Figures 13, 14:
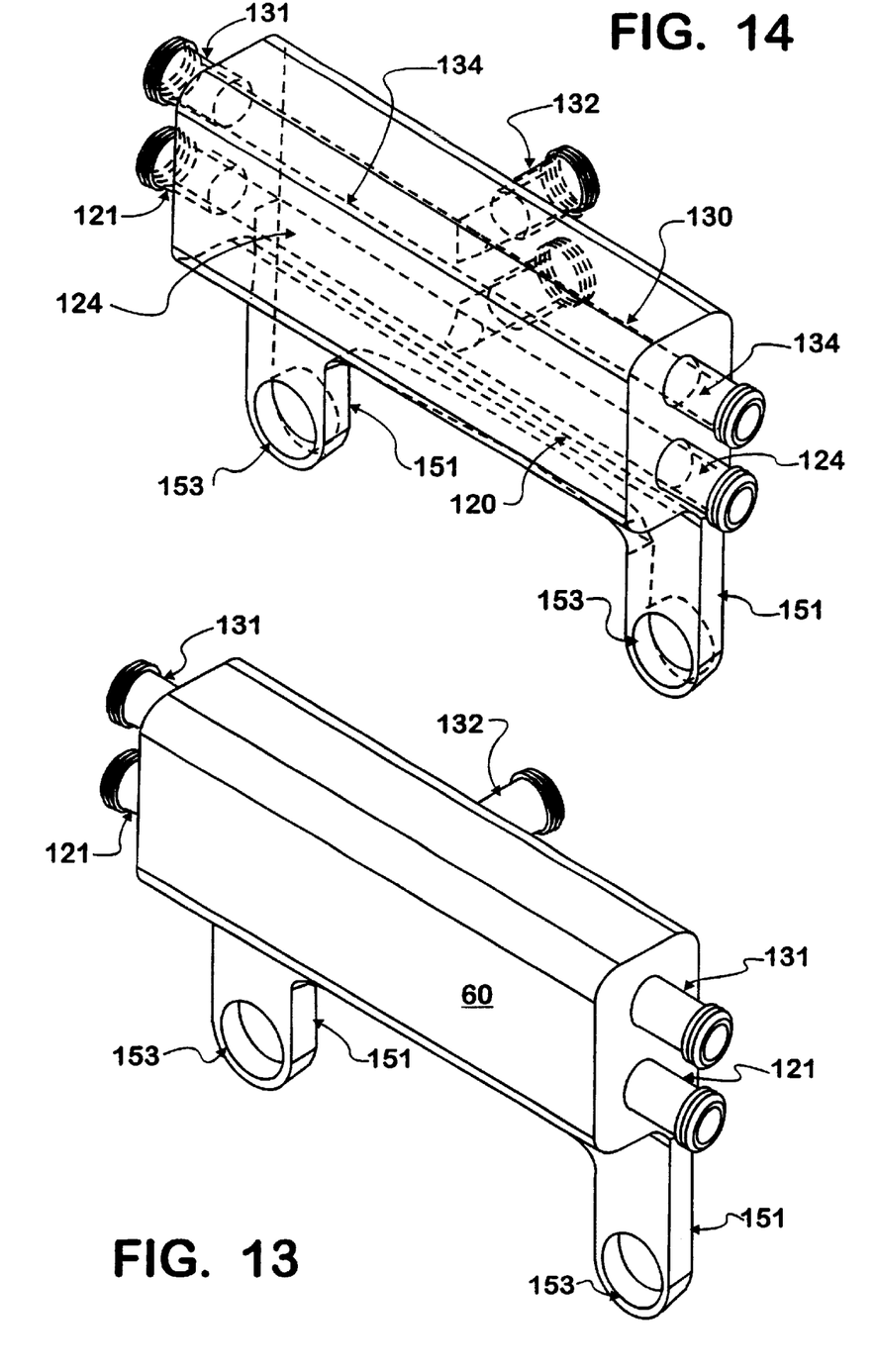
FIG. 13 is a rear perspective of the fuel draw and return manifold shown in FIG. 12.
FIG. 14 is a rear perspective with phantom interior passages shown of the fuel draw and return manifold shown in FIG. 12.
Figure 15:
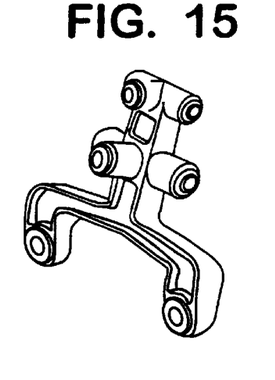
FIG. 15 is a front perspective view of a third embodiment of a one piece dual fuel draw and return manifold with an integral mounting body made in accordance with the invention with recesses in the front and rear surfaces of the mounting bracket and engagement legs.
Figures 16, 20:
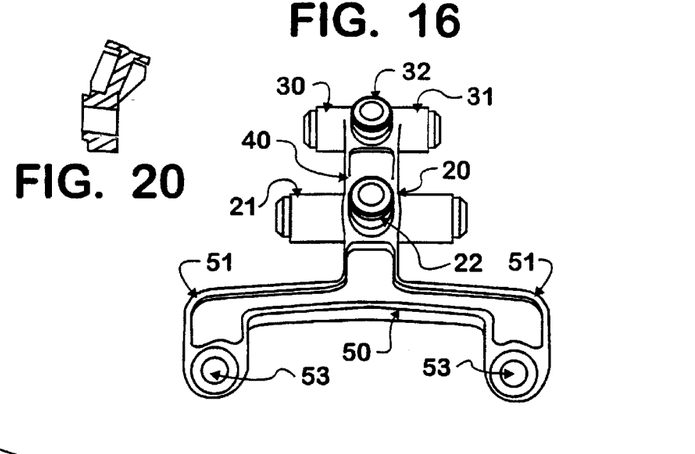
FIG. 16 is a front view of the fuel draw and return manifold shown in FIG. 15.
FIG. 20 is the Section 20—20 cutaway of view of the fuel draw and return manifold shown in FIG. 19.
Figure 17:
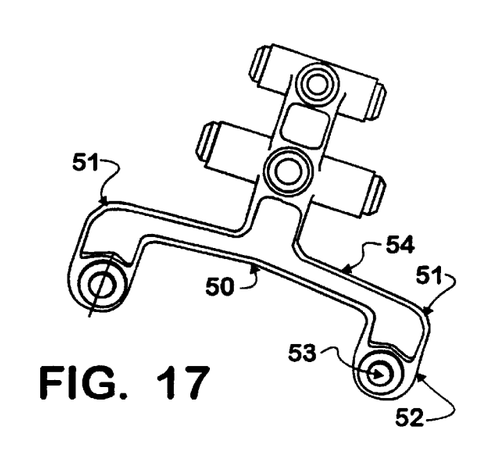
FIG. 17 is an auxiliary front view of the fuel draw and return manifold shown in FIG. 15.
Figure 18:
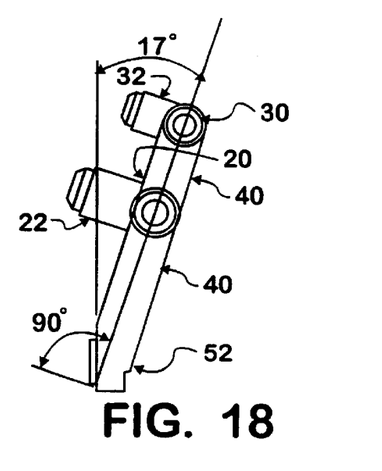
FIG. 18 is a side view of the fuel draw and return manifold shown in FIG. 15.
Figures 19, 21:
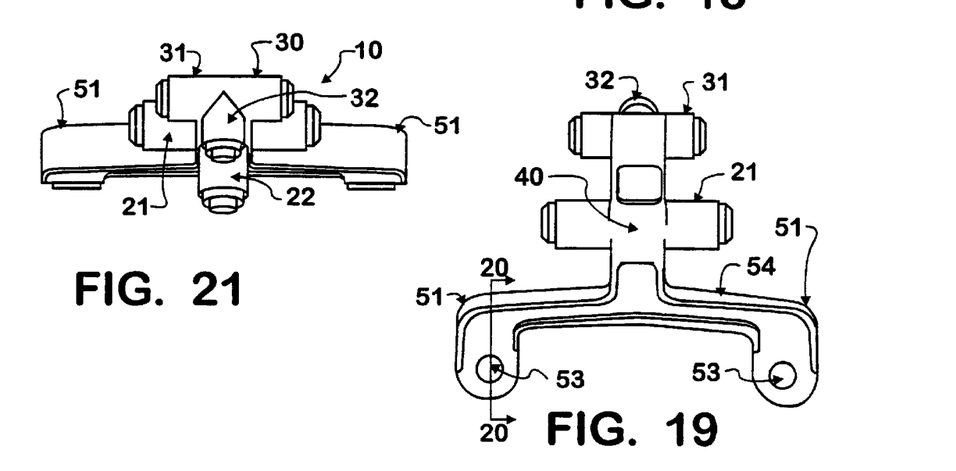
FIG. 19 is a back view of the fuel draw and return manifold shown in FIG. 15.
FIG. 21 is a top view of the fuel draw and return manifold shown In FIG. 15.

The preferred embodiment of the manifold 10 will have the tees integrated with a mounting bracket 40. The mounting bracket 40 may be generally solid rectangular structure when viewed from the front and side as shown in the figures. It may alternatively include recesses to facilitate its manufacture when the manifold 10 is a casing. In the preferred embodiment, the three way return tee 30 is engaged to one end of the mounting bracket 40. In this embodiment the three way supply tee 20 is engaged within the mounting bracket 40 at a position below the three way return tee 30 in the vehicle installed position. The alternative tee embodiment involves the use of an Integral mounting body. The relative position of the three way tees is similar on this embodiment except that the externals to the tees are fully enclosed to the solid body. The solid piece has the passages extruded within or cut to form the three way passages. This embodiment is shown in FIGS. 12 to 14. There is a three way supply tee 120 with three ports with interconnecting internal passageways 124 for vehicles with two tanks. Only two ports are used if there is only one fuel tank on the vehicle. Of the three ports for the dual tank vehicle, there is a supply-from-tank connection port 121 for engagement to each of the fuel tanks, and a supply-to-engine connection, port 122 for engagement to and supply of fuel to the engine. There is a three way return tee 130 with three parts with interconnecting internal passageways 134 for vehicles with two tanks. Only two ports are used if there is only one fuel tank on the vehicle. Of the three ports of the three way return tee 130 for a two tank vehicle, there is a return-to-tank connection port 131 for engagement to each of the fuel tanks, and a return-to-manifold connection port 132 for engagement to and receipt of fuel from the engine. The mounting body 60 may be configured such the return-to-manifold connection port 132 of the three way return tee 130 and the supply-to-engine connection port 122 of the three way supply tee 120 are each directed toward the engine when the mounting body 60 is engaged to the chassis engagement component. In one embodiment internal passages of the return-to-manifold connection port 132 and the supply-to-engine connection port 122 are in parallel. The return-to-tank connection ports 131 of the three way return tee 130 and the supply-from tank connection ports 121 of the three way supply tee 120 may each be directed outwards from a centerline of the vehicle towards the fuel tanks when the manifold 10 is engaged. The integrated mounting means 50 may be integrally engaged on a lower portion of the mounting body 60. The integrated mounting means 50 may be simply comprised of a pair of engagement legs 151 as shown FIGS. 12 to 14. The engagement legs 151 are engaged to the mounting body 60. The engagement legs 151 will have mounting means 153. The mounting means 153 can be engaged with any form of strong fastener. In the embodiment shown in FIGS. 12 to 14, the mounting means 153 are simple bolt holes which allow installation to existing vehicle transmission bolts. The bolts may be removed and reinstalled to engage the mounting body 60. The engagement legs 151 are spaced apart such that the mounting means may be attached to both upper sides of the transmission. The engagement legs 151 may be made of a flat stock or generally flat with recesses as necessary for casting manufacture of the mounting body 60.

When installed on a vehicle, the integrated mounting means 50 will be installed to a chassis engagement component. The chassis engagement component may be any convenient part of the chassis such as the frame rails, the cross member supports, or a chassis drive train component such as the engine, the transmission, a drive shaft, or a drive shaft mounted brake. In each case the Integrated mounting means 50 will be of a geometry to allow easy Installation to the chassis engagement component. The preferred chassis engagement component is the transmission.

For installation to the transmission, the embodiment of the manifold 10 will have two chassis engagement legs 51. The engagement legs 51 will have engagement feet 52 which will have mounting means 53. The mounting means 53 can be engaged with any form of strong fastener. In the preferred embodiment shown In FIG. 7, the mounting means 53 are simple bolt holes which allow installation to existing vehicle transmission bolts. The bolts may be removed and reinstalled to engage the manifold 10. The engagement legs 51 are spaced apart such that the engagement feet may be attached to both upper sides of the transmission. The engagement legs 51 and engagement feet 52 may be made of a flat stock or generally fat with recesses as necessary for casting manufacture of the manifold 10. The engagement legs 51 may be shaped with a right angle with a first side 54 approximately perpendicular to said bracket and a second side, the engagement feet 52, turned downwards when engaged to the chassis engagement component. These right angled engagement legs 51 will facilitate installation to a transmission or drive-train component.

In one embodiment the legs 51 and engagement feet 52 are in the same plane as the integrated mounting bracket 40. In the preferred embodiment, the mounting bracket 40 and the engagement legs 51 are engaged such that said supply-to-engine connection port 22 of said three way supply tee 20 and the return-to-manifold connection port 32 of said three way return tee 30 are at a slight up angle X to the horizontal plane of the vehicle when the engagement legs 51 are engaged to the chassis engagement component. The preferred up angle X is between fifteen and twenty degrees with seventeen (17) degrees with the horizontal being ideal.

For all embodiments, the manifold 10 will be a single integrated piece. The preferred material for the manifold is to be cast of aluminum. Aluminum is desirable due to its light weight and strength. Using A360.0 Aluminum, a manifold may be made as light as 0.64 pounds mass. For ease of manufacture of the cast aluminum version of the manifold 10, there may be recesses in the front and rear surfaces of the mounting bracket 40 and engagement legs 51 as shown in FIGS. 15 to 21. The engagement feet 52 may be tapered at the engagement means 53 as shown.

As described above, the dual fuel supply and return manifold 10 of the present invention provides a number of advantages, some of which have been described above and others of which are inherent in the invention. Also, modifications may be proposed to the dual fuel supply and return manifold 10 without departing from the teachings herein. Accordingly, the scope of the invention is only to be limited as necessitated by the accompanying claims.

What is claimed is:

1. A one piece dual draw and return fuel manifold for use with a vehicle with a chassis, the chassis having an engine, a transmission engaged to the engine, a drive-line engaged to the transmission and a drive axle with wheels, and two fuel tanks for supplying fuel to the engine, comprising:

a three way return tee with a return-to-tank connection port for engagement to each of the fuel tanks, and a return-to-manifold connection port;

a three way supply tee with a supply-from-tank connection port for engagement to each of the fuel tanks, and a supply-to-engine connection port;

a one-piece manifold body, said three way return tee and said three way supply tee formed in one piece with said body;

two chassis engagement legs, each said leg formed in one piece with a lower side of said body; and each said chassis engagement leg having a chassis engagement means at an end for engagement to a chassis engagement component, and wherein said return-to-manifold and supply-to-engine connection ports are located between and directed substantially perpendicular to said legs.

2. The draw and return manifold of claim 1, wherein:

said chassis engagement legs and said chassis engagement means are spaced to allow engagement to upper sides of the transmission.

3. The draw and return manifold of claim 1 wherein said body, said three way supply tee, said three way return tee, and said chassis engagement legs are cast of aluminum.

* * * * *

UNITED STATES PATENT AND TRADEMARK OFFICE
CERTIFICATE OF CORRECTION

PATENT NO. : 6,394,217 B2
DATED : May 28, 2002
INVENTOR(S) : Michael C. DePoy and Curt J. Studebaker It is certified that error appears in the above-identified patent and that said Letters Patent is hereby corrected as shown below:

<u>Title page,</u>
Item [75], should read:

-- [75] Michael C. DePoy, Fort Wayne, IN; Curt J. Studebaker, Columbia City, IN (US) --

Signed and Sealed this

Thirteenth Day of May, 2003

JAMES E. ROGAN
*Director of the United States Patent and Trademark Office*